US011356870B2

(12) United States Patent
Eleftheriadis et al.

(10) Patent No.: US 11,356,870 B2
(45) Date of Patent: Jun. 7, 2022

(54) RADIO BASE STATION AND NODE FOR USE IN A COMMUNICATION NETWORK, AND METHODS OF OPERATING THE SAME

(71) Applicant: Telefonaktiebolaget LM Ericsson (publ), Stockholm (SE)

(72) Inventors: Lackis Eleftheriadis, Gävle (SE); Sudipta Dutta, Kolkata (IN); Athanasios Karapantelakis, Solna (SE); Arup Kumar Roy, Kolkata (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 16/761,227

(22) PCT Filed: Nov. 3, 2017

(86) PCT No.: PCT/EP2017/078191
§ 371 (c)(1),
(2) Date: May 1, 2020

(87) PCT Pub. No.: WO2019/086121
PCT Pub. Date: May 9, 2019

(65) Prior Publication Data
US 2020/0367077 A1     Nov. 19, 2020

(51) Int. Cl.
*H04W 24/04*  (2009.01)
*H04L 41/0654*  (2022.01)

(52) U.S. Cl.
CPC ......... *H04W 24/04* (2013.01); *H04L 41/0654* (2013.01)

(58) Field of Classification Search
CPC .............. H04W 24/04; H04L 41/0654; H04L 12/2803; H04B 10/0775; H04B 10/2507; H04B 10/2572
See application file for complete search history.

(56) References Cited

U.S. PATENT DOCUMENTS

| | | | |
|---|---|---|---|
| 10,401,417 B2* | 9/2019 | Ren | G01R 31/088 |
| 10,424,909 B2* | 9/2019 | Stoupis | H02H 3/042 |
| 10,601,246 B2* | 3/2020 | Ding | H02J 9/066 |
| 2008/0147335 A1 | 6/2008 | Adest et al. | |

FOREIGN PATENT DOCUMENTS

| | | |
|---|---|---|
| EP | 3007310 A2 | 4/2016 |
| EP | 3007310 A3 | 9/2016 |

* cited by examiner

*Primary Examiner* — Chandrahas B Patel
(74) *Attorney, Agent, or Firm* — Murphy, Bilak & Homiller, PLLC

(57) ABSTRACT

There is provided a radio access node (40) for use in a communication network (32), the radio access node (40) being associated with a local energy storage system (122) that is part of a distributed energy storage network, the radio access node (40) being adapted to monitor the operation of a power distribution network (118); in the event of a fault in the power distribution network (118), control the local energy storage system (122) to supply power to the power distribution network (118). A radio access node (40) for use in a communication network (32) is provided. The node (40) is able to locate a fault on a power distribution network (118) and to generate a map of at least a part of said power distribution network (118), indicating the location of the fault.

20 Claims, 10 Drawing Sheets

RADIO BASE STATION AND NODE FOR USE IN A COMMUNICATION NETWORK, AND METHODS OF OPERATING THE SAME

TECHNICAL FIELD

The disclosure relates to a radio base station and node for use in a communication network, and in particular to a radio base station and node that can support a power distribution network.

BACKGROUND

In power distribution networks, the use of energy storage is rapidly increasing. Traditionally, energy is stored centrally in a power distribution network, and energy is sent to a part of the distribution network as and when required. FIG. 1 illustrates an exemplary power distribution network having centralised energy storage.

In FIG. 1, the power distribution network 2 generally comprises a number of power sources 4 (for example fossil fuel power stations, nuclear power stations, wind turbines, hydroelectric dams, etc.) that generate energy/electricity and that are connected to an extra high voltage part 6 of the distribution network (e.g. that operates in the range of 265-275 kiloVolts (kV). The extra high voltage part 6 is connected to a transmission grid 8, into which other power sources 10, such as industrial and mid-sized power plants, can feed energy/electricity. The transmission grid 8 typically carries electricity at high voltage, e.g. 110 kV and above. The transmission grid 8 is connected to a distribution grid 12 (that typically operates at a low voltage 50 kV), and a centralised energy storage system 14 is connected to the distribution grid 12. The centralised energy storage system 14 stores energy when there is a surplus of energy in the network 2, and distributes energy to the network 2 when demand from end users exceeds the supply from the power sources 4, 10 and/or when a fault occurs in the network 2. The distribution grid 12 is connected to a number of sub-stations 16 that distribute the energy/electricity into an alternating current (AC) distribution grid 18. Various different loads 20 (i.e. consumers of the energy/electricity) are connected to the AC distribution grid 18. The loads 20 may include electricity-consuming devices in homes and businesses. Radio base stations (RBSs) 22 that are part of a communication network can also receive electricity from the AC distribution grid 18. If a fault is detected in the AC distribution network 18, for example the available energy/electricity is below a required or minimum voltage level, then energy stored in the centralised energy storage system 14 can be released to the AC distribution network 18.

However, since the centralised energy storage system 14 is located on the higher level of the transmission lines, e.g. 10 KV or 32 KV (e.g. at the distribution grid 12 level), the energy storage system 14 is located far away from the consumers/load 20/22, for example that are in a city. This means that when a power dip occurs, the energy from the centralised energy storage system 14 cannot be delivered in time to consumers, and this can be a problem. Another problem is that when designing power transmission lines, "power grid lines" are organized in redundant power rings for distributing energy when faults occur. This type of design increases the latency and fault location compounding time needed for power grid restoration. The restoration time of the AC distribution grid 18 based on centralised energy storage 14 can be up to 2 minutes, which means that the electricity supply to the load 20 is not restored quickly enough. In addition, as energy from the centralised energy storage system 14 may need to be transferred over a long distance, energy losses can occur. As a result of the energy losses during transmission, many stabilisers may need to be included along the transmission line in order to stabilise the voltage and frequency.

Since the demand to stabilise and control the energy flow from energy storage devices is increasing, improvements in the storage and distribution of energy/electricity in a power distribution network are therefore desired.

SUMMARY

One alternative to centralised energy storage is distributed energy storage in which energy is stored at a number of locations in the power distribution network that are closer to the end-users/consumers. To improve the management and/or control of the distribution of energy from the distributed energy storage, the present disclosure proposes that a radio access node in a communication network can be associated with a local energy storage system in a distributed energy storage network, and that the radio access node can be used to control the supply of power from the local energy storage system to the power distribution network in the event of a fault.

According to a first aspect, there is provided a radio access node for use in a communication network, the radio access node being associated with a local energy storage system that is part of a distributed energy storage network, the radio access node being adapted to monitor the operation of a power distribution network; in the event of a fault in the power distribution network, control the local energy storage system to supply power to the power distribution network.

In some embodiments, the radio access node is adapted to detect a fault in the power distribution network.

In some embodiments, the radio access node is adapted to monitor a power supply to the radio access node from the power distribution network to detect a fault in the power distribution network.

In some embodiments, the radio access node is adapted to detect a fault in the power distribution network if the power supplied by the power distribution network is below a threshold value.

In some embodiments, the radio access node is adapted to receive a control signal from a node in the communication network indicating a fault.

In some embodiments, the radio access node is adapted to monitor the operation of the power distribution network by monitoring a power supply to the radio access node from the power distribution network; and the radio access node is further adapted to send an indication of the operation of the power distribution network to a node in the communication network.

In some embodiments, the radio access node is further adapted to monitor the operation and/or status of the local energy storage system; and send an indication of the operation and/or status of the local energy storage system to a node in the communication network or a control node for the power distribution network.

In some embodiments, the radio access node is further adapted to control the local energy storage system to supply power to the power distribution network in response to receiving a signal from a node in the communication network or a control node for the power distribution network.

In some embodiments, the radio access node is further adapted to send, to another radio access node in the communication network, an indication of the operation of the power distribution network, an indication of the presence or absence of a fault in the power distribution network, and/or an indication of the operation and/or status of the local energy storage system.

In some embodiments, the local energy storage system comprises a plurality of energy storage cabinets.

In some embodiments, the communication network comprises a plurality of radio access nodes, each radio access node associated with a respective local energy storage system of the distributed energy storage system.

In some embodiments, the radio access node comprises a scheduler that is adapted to control (i) the sending of information to a node in the communication network, (ii) the sending of information to a control node for the power distribution network and/or (iii) the local energy storage system to supply power to the power distribution network.

According to a second aspect, there is provided a method of operating a radio access node in a communication network, the radio access node being associated with a local energy storage system that is part of a distributed energy storage network, the method comprising monitoring the operation of a power distribution network; and, in the event of a fault in the power distribution network, controlling the local energy storage system to supply power to the power distribution network.

In some embodiments, the method further comprises the step of detecting a fault in the power distribution network.

In some embodiments, the step of detecting a fault comprises monitoring a power supply to the radio access node from the power distribution network.

In some embodiments, the step of detecting a fault comprises detecting a fault in the power distribution network if the power supplied by the power distribution network is below a threshold value.

In some embodiments, the step of detecting a fault comprises receiving a control signal from a node in the communication network indicating a fault.

In some embodiments, the step of monitoring comprises monitoring a power supply to the radio access node from the power distribution network; and the method further comprises the step of sending an indication of the operation of the power distribution network to a node in the communication network.

In some embodiments, the method further comprises the steps of monitoring the operation and/or status of the local energy storage system; and sending an indication of the operation and/or status of the local energy storage system to a node in the communication network or a control node for the power distribution network.

In some embodiments, the method further comprises the step of controlling the local energy storage system to supply power to the power distribution network in response to receiving a signal from a node in the communication network or a control node for the power distribution network.

In some embodiments, the method further comprises the step of sending, to another radio access node in the communication network, an indication of the operation of the power distribution network, an indication of the presence or absence of a fault in the power distribution network, and/or an indication of the operation and/or status of the local energy storage system.

In some embodiments, the local energy storage system comprises a plurality of energy storage cabinets.

In some embodiments, the communication network comprises a plurality of radio access nodes, each radio access node associated with a respective local energy storage system of the distributed energy storage system.

In some embodiments, the radio access node comprises a scheduler that is for controlling (i) the sending of information to a node in the communication network, (ii) the sending of information to a control node for the power distribution network and/or (iii) the local energy storage system to supply power to the power distribution network.

According to a third aspect, there is provided a computer program product comprising a computer readable medium having computer readable code embodied therein, the computer readable code being configured such that, on execution by a suitable computer or processor, the computer or processor is caused to perform the method of the second aspect or any embodiment thereof.

According to a fourth aspect, there is provided a radio access node for use in a communication network, the radio access node being associated with a local energy storage system that is part of a distributed energy storage network, the radio access node comprising a processor and a memory, said memory containing instructions executable by said processor whereby said radio access node is operative to perform the method of the second aspect or any embodiment thereof.

According to a fifth aspect, there is provided a radio access node for use in a communication network, the radio access node being associated with a local energy storage system that is part of a distributed energy storage network, the radio access node comprising a first module configured to monitor the operation of a power distribution network; a second module configured to, in the event of a fault in the power distribution network, control the local energy storage system to supply power to the power distribution network.

According to a sixth aspect, there is provided a node for use in a communication network, the node being adapted to manage information relating to one or more of: (i) the operation of a power distribution network, (ii) the presence or absence of a fault in the power distribution network, and (iii) the operation and/or status of a plurality of local energy storage systems of a distributed energy storage network associated with respective radio access nodes in the communication network.

In some embodiments, the node is adapted to manage the information by one or both of sending the information to, and receiving the information from, a control node for the power distribution network.

In some embodiments, the node is adapted to manage the information by one or both of sending the information to, and receiving the information from, the radio access node in the communication network.

In some embodiments, the node is adapted to manage the information by one or both of sending the information to, and receiving the information from, a plurality of radio access nodes in the communication network, each radio access node being associated with a respective local energy storage system of the distributed energy storage network.

In some embodiments, the node is adapted to receive an indication of the presence and/or absence of a fault in the power distribution network from the plurality of radio access nodes; and the node is further adapted to determine the location of a fault in the power distribution network on the basis of the received indication or indications.

In some embodiments, the node is further adapted to send an indication of the determined location of the fault to a control node for the power distribution network.

In some embodiments, the node is further adapted to generate a map of at least part of the power distribution network based on the received indication, the map indicating the presence and/or absence of a fault in the power distribution network at a plurality of locations.

In some embodiments, the node is adapted to send a control signal to the radio access node indicating that the local energy storage system is to be controlled to supply power to the power distribution network.

In some embodiments, the indication of the presence or absence of a fault in the power distribution network is received from a radio access node and indicates a status of a power supply to the radio access node from the power distribution network.

According to a seventh aspect, there is provided a method of operating a node in a communication network, the method comprising managing information relating to one or more of: (i) the operation of a power distribution network, (ii) the presence or absence of a fault in the power distribution network, and (iii) the operation and/or status of a plurality of local energy storage systems of a distributed energy storage network associated with respective radio access nodes in the communication network.

In some embodiments, the step of managing comprises one or both of sending the information to, and receiving the information from, a control node for the power distribution network.

In some embodiments, the step of managing comprises one or both of sending the information to, and receiving the information from, the radio access node in the communication network.

In some embodiments, the step of managing comprises one or both of sending the information to, and receiving the information from, a plurality of radio access nodes in the communication network, each radio access node being associated with a respective local energy storage system of the distributed energy storage network.

In some embodiments, the receiving comprises receiving an indication of the presence and/or absence of a fault in the power distribution network from the plurality of radio access nodes; and the method further comprises the step of determining the location of a fault in the power distribution network on the basis of the received indication or indications.

In some embodiments, the method further comprises the step of sending an indication of the determined location of the fault to a control node for the power distribution network.

In some embodiments, the method further comprises the step of generating a map of at least part of the power distribution network based on the received indication, the map indicating the presence and/or absence of a fault in the power distribution network at a plurality of locations.

In some embodiments, the method further comprises the step of sending a control signal to the radio access node indicating that the local energy storage system is to be controlled to supply power to the power distribution network.

In some embodiments, the indication of the presence or absence of a fault in the power distribution network is received from a radio access node and indicates a status of a power supply to the radio access node from the power distribution network.

According to an eighth aspect, there is provided a computer program product comprising a computer readable medium having computer readable code embodied therein, the computer readable code being configured such that, on execution by a suitable computer or processor, the computer or processor is caused to perform the method of the sixth aspect or any embodiment thereof.

According to an ninth aspect, there is provided a node for use in a communication network, the node comprising a processor and a memory, said memory containing instructions executable by said processor whereby said node is operative to perform the method of the sixth aspect or any embodiment thereof.

According to a tenth aspect, there is provided a node for use in a communication network, the node comprising a module configured to manage information relating to one or more of: (i) the operation of a power distribution network, (ii) the presence or absence of a fault in the power distribution network, and (iii) the operation and/or status of a plurality of local energy storage systems of a distributed energy storage network associated with respective radio access nodes in the communication network.

One or more of the above aspects and/or embodiments can provide various advantages over existing power distribution networks that use centralised energy storage.

- For example, the use of a radio access node to control distribution of energy from a local energy storage system that is part of a distributed energy storage network can provide a low latency control method compared to centralised distributed control.
- As another example, control by a radio access node that is local to the fault in the power distribution network enables a fast response to power outages to eliminate the power dips that are generated. For example, certain embodiments provide for power restoration after an outage in less than 10 milliseconds, compared to of the order of 2 minutes in a centralised energy storage system.
- As yet another example, energy can be delivered on demand very quickly to stabilise the voltage in the power distribution network, since the local energy storage is near to the end user (i.e. the load).
- Another advantage is that transmission and distribution losses can be lower since power is supplied from the local energy storage system at the radio access node site instead of from the centralised energy storage located far away from the loads (end users).
- In some cases faults can be localised faster, and local energy storage can be activated based on radio access node control, which can be a significant advantage when several radio access nodes can communicate with each other.
- Another advantage is that the local energy storage system can make use of an existing radio access node site, which means that the (or part of the) power infrastructure already exists, so no (or little) new energy storage infrastructure needs to be built.
- Certain embodiments provide for faster activation and localisation of outages and faults, and the sending of this information to a Supervisory Control and Data Acquisition (SCADA) node associated with the power distribution network, and to other radio access nodes, for example via the X2 interface.
- The solution provided above can be provided as a value added service (VAS) for end users (e.g. homes and businesses) that are close to a radio access node site in which uninterrupted power can be provided to those users.
- Another advantage is that the radio access node sites can be attached to power distribution networks and flexibly isolated in the event of faults occurring. This functionality can be solely operated through existing communication network infrastructure and associated orchestration control. Therefore, as radio access node sites are self-reliant and do not need intervention by the control functions of the power distribution network, the fault isolation and backup power restoration is faster than the traditional approach.

Certain embodiments enable interoperability with power distribution companies (PDCs) to manage load demands in a zone by tracking and orchestrating the power backups in microsites (the radio access node sites).

Another advantage is that the use of radio access node sites for local energy storage can be a source of revenue for communication network operators, who may already own licenses for land where radio access nodes are deployed.

BRIEF DESCRIPTION OF THE DRAWINGS

Embodiments of this disclosure are described herein with reference to the following drawings, in which.

DETAILED DESCRIPTION

Figure 1:
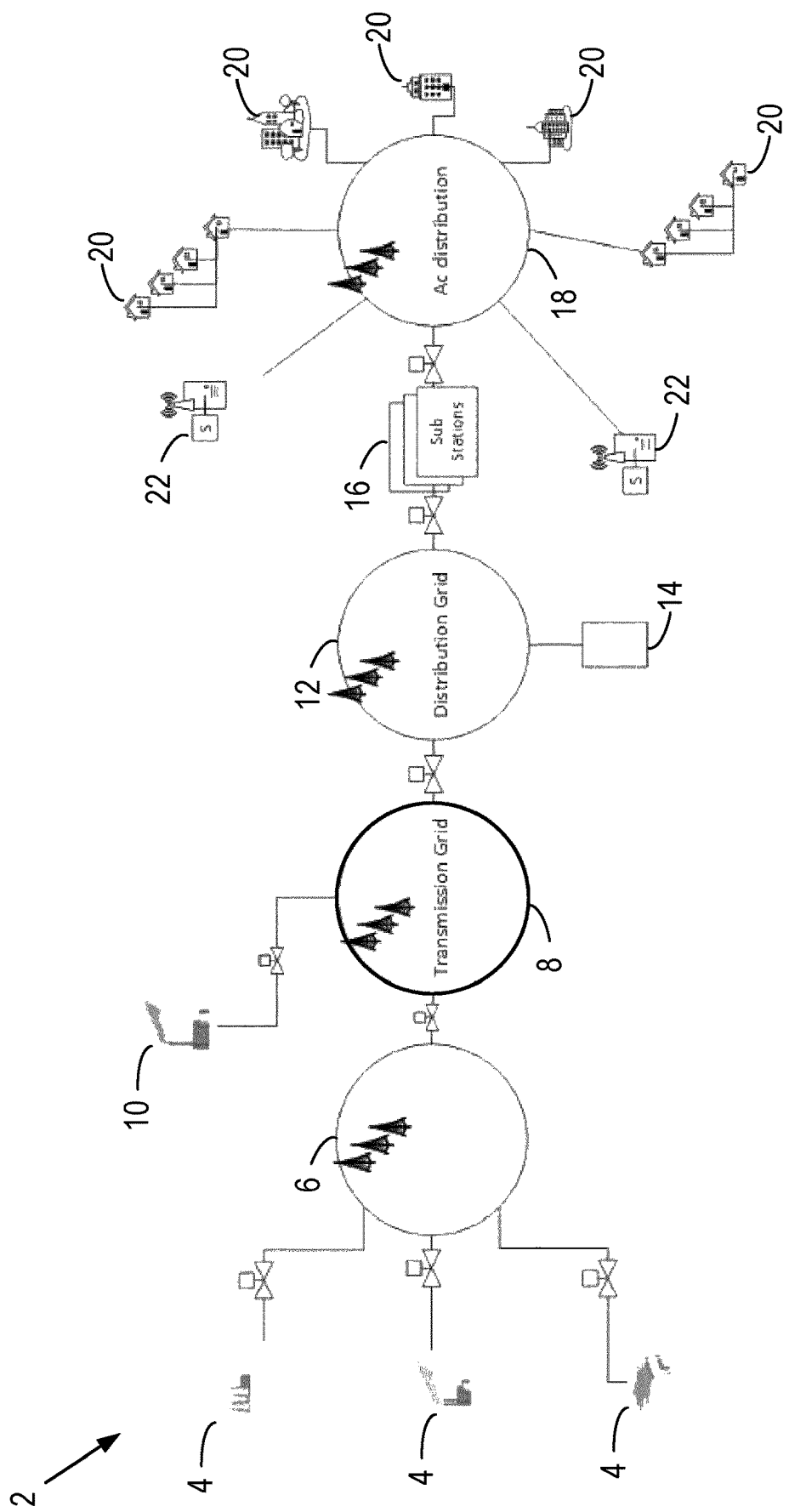
FIG. 1 illustrates a conventional power distribution network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialised function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, wireless communication device, terminal device or node equipped with a radio interface allowing for at least one of: transmitting signals in uplink (UL) to a radio access node and receiving and/or measuring signals in downlink (DL) from a radio access node.

One or more cells are associated with a radio base station (RBS), where a radio base station comprises in a general sense any radio access node transmitting radio signals in the downlink and/or receiving radio signals in the uplink. Some example radio base stations/radio access nodes, or terms used for describing base stations/access nodes, are eNodeB, eNB, NodeB, macro/micro/pico/femto radio base station, home eNodeB (also known as femto base station), relay, repeater, sensor, transmitting-only radio nodes or receiving-only radio nodes. A radio access node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Unless otherwise indicated herein, the signalling described is either via direct links or logical links (e.g. via higher layer protocols and/or via one or more network nodes).

Figure 2:
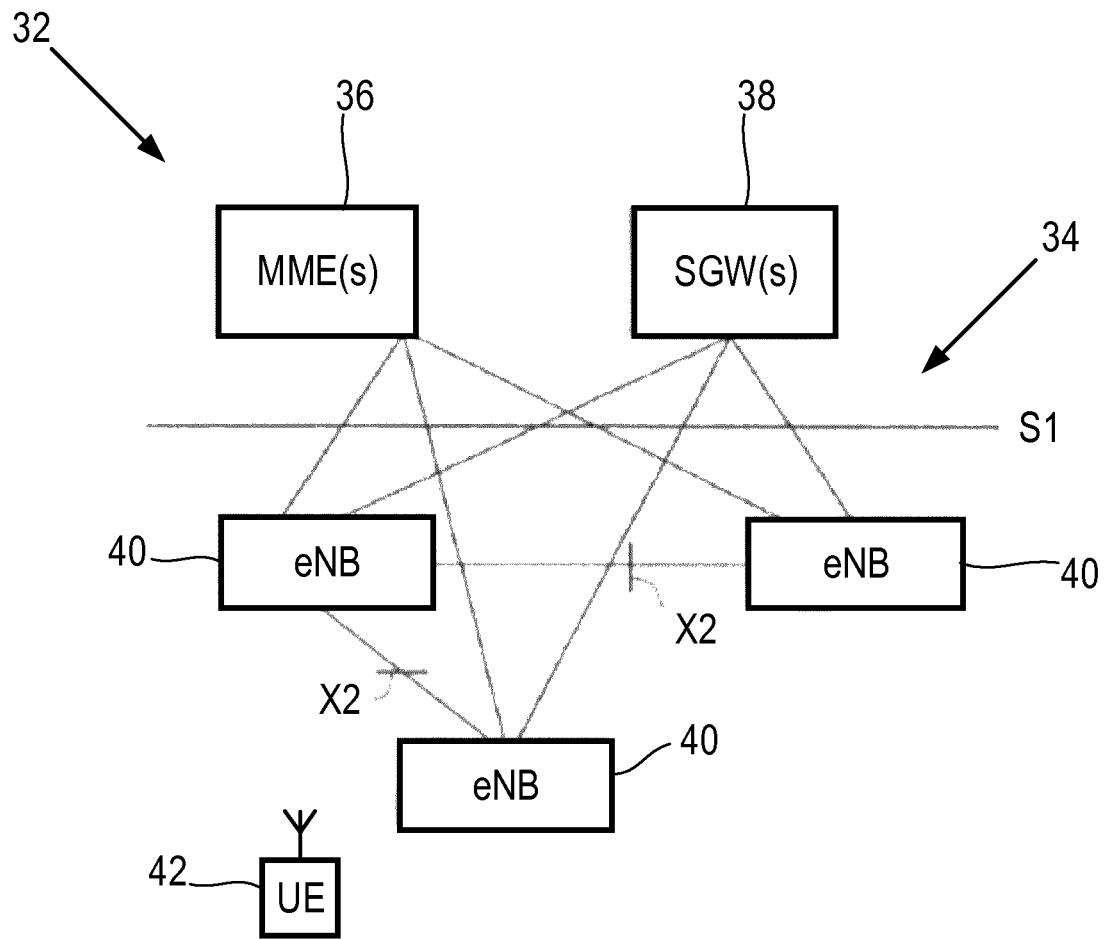
FIG. 2 is a non-limiting example block diagram of a LTE communications network.

FIG. 2 shows an example diagram of an evolved Universal Mobile Telecommunications System (UMTS) Terrestrial Radio Access Network (E-UTRAN) architecture as part of a Long Term Evolution (LTE)-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations or radio access nodes 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42.

Figure 3:
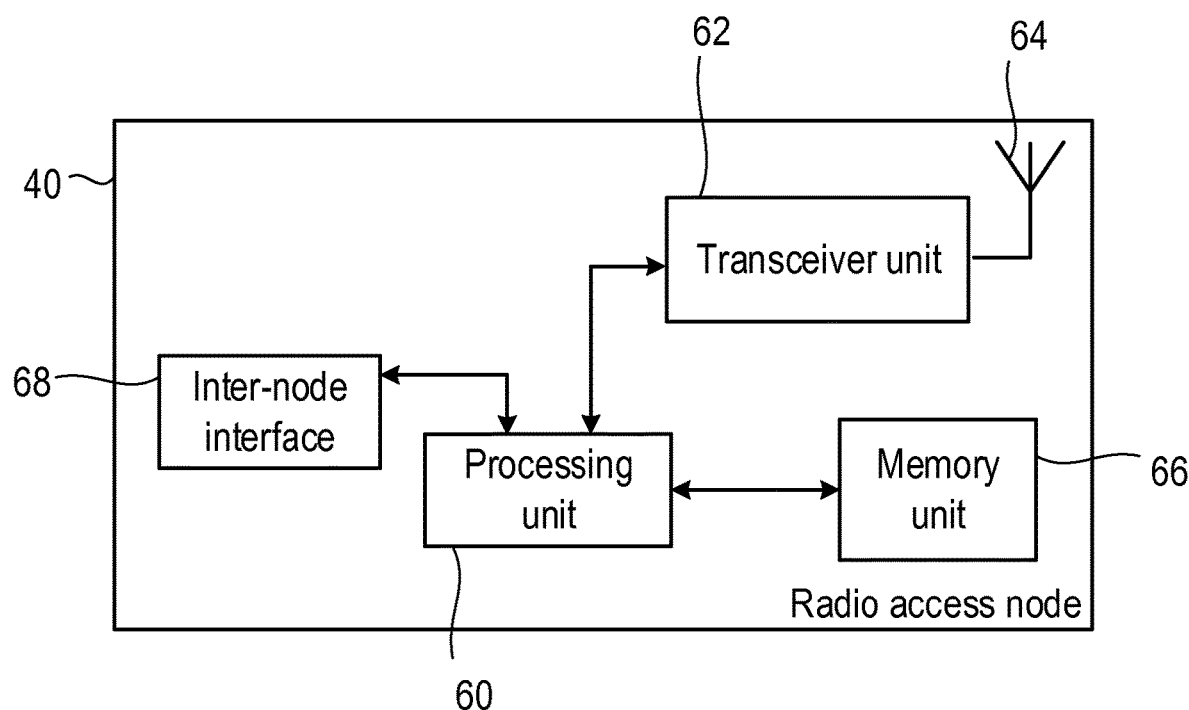
FIG. 3 is a block diagram of a radio access node according to an embodiment.

FIG. 3 shows a radio access node (for example a cellular network base station such as a NodeB or an eNodeB, eNB) 40 that can be adapted or configured to operate according to the example embodiments described. The radio access node 40 comprises a processor or processing unit 60 that controls the operation of the radio access node 40. The processing unit 60 is connected to a transceiver unit 62 (which comprises a receiver and a transmitter) with associated antenna(s) 64 which are used to transmit signals to, and receive signals from, UEs 42 in the network 32. The radio access node 40 also comprises a memory or memory unit 66 that is connected to the processing unit 60 and that contains instructions or computer code executable by the processing unit 60 and other information or data required for the operation of the radio access node 40. The radio access node 40 also includes components and/or circuitry 68 for allowing the radio access node 40 to exchange information with another radio access node 40 (for example via an X2 interface), and/or with a core network node 36, 38 (for example via an S1 interface). It will be appreciated that base stations for use in other types of network (e.g. UTRAN or WCDMA RAN) will include similar components to those shown in FIG. 3 and appropriate interface circuitry 68 for enabling communications with the other radio access nodes in those types of networks (e.g. other base stations, mobility management nodes and/or nodes in the core network). It will be appreciated that a radio access node 40 can be implemented as a number of distributed functions in the radio access network (RAN).

Figure 4:
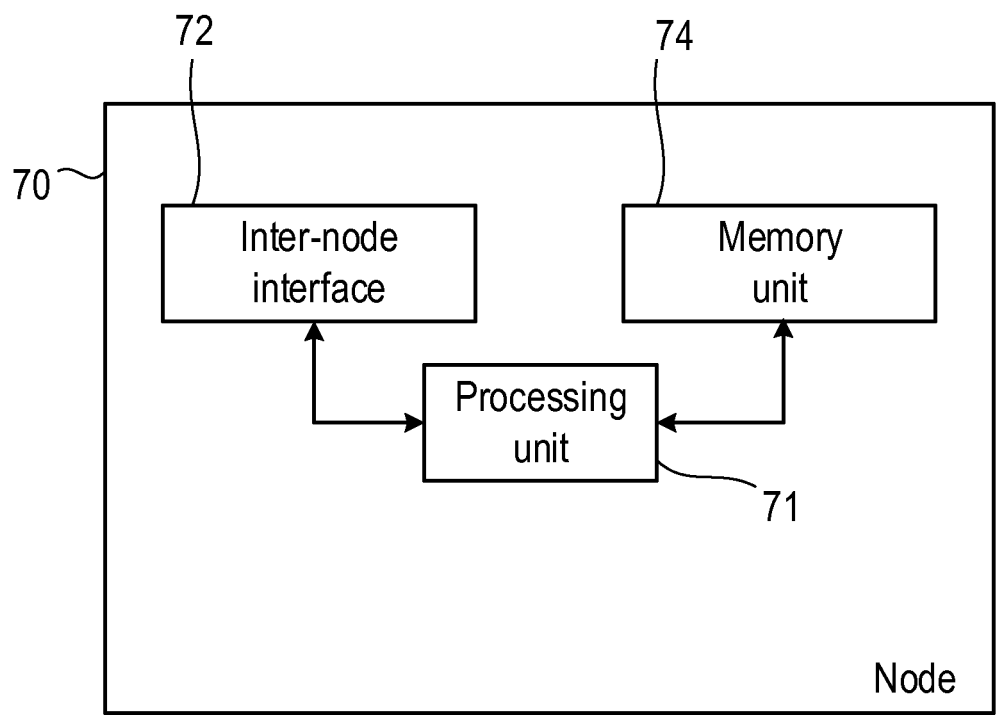
FIG. 4 is a block diagram of a node according to an embodiment.

FIG. 4 shows a network node 70 that can be used in the example embodiments described. The node 70 can be part of the core network 34 or separate to the core network 34. In certain embodiments described herein, the node 70 is referred to as an 'RBS Power Orchestrator', 'power orchestrator' or simply 'orchestrator'. The node 70 comprises a processing unit 71 that controls the operation of the node 70. The processing unit 71 is connected to interface components and/or circuitry 72 for allowing the node 70 to exchange information with radio access nodes 40 in the network 32, and/or with nodes in a power distribution network, for example a Supervisory Control and Data Acquisition (SCADA) node associated with the power distribution network. The node 70 also comprises a memory unit 74 that is connected to the processing unit 71 and that stores program and other information and data required for the operation of the node 70.

It will be appreciated that only the components of the radio access node 40 and node 70 required to explain the embodiments presented herein are illustrated in FIGS. 3 and 4.

Although the embodiments of the present disclosure will mainly be described in the context of LTE, it will be appreciated by those skilled in the art that the problems and solutions described herein are equally applicable to other types of wireless access networks and user equipments (UEs) implementing other access technologies and standards, and thus LTE (and the other LTE specific terminology used herein) should only be seen as examples of the technologies to which the techniques can be applied. In particular, the problems and techniques described herein could be implemented in so-called 5G standards that are in development.

As noted above, distributed energy storage can be used in which energy is stored at a number of locations in the power distribution network that are closer to the end-users/consumers. In particular, a radio access node 40 in a communication network 32 can be associated with a local energy storage system in a distributed energy storage network, and the radio access node 40 can be used to control the supply of power from the local energy storage system to the power distribution network in the event of a fault.

Figure 5:
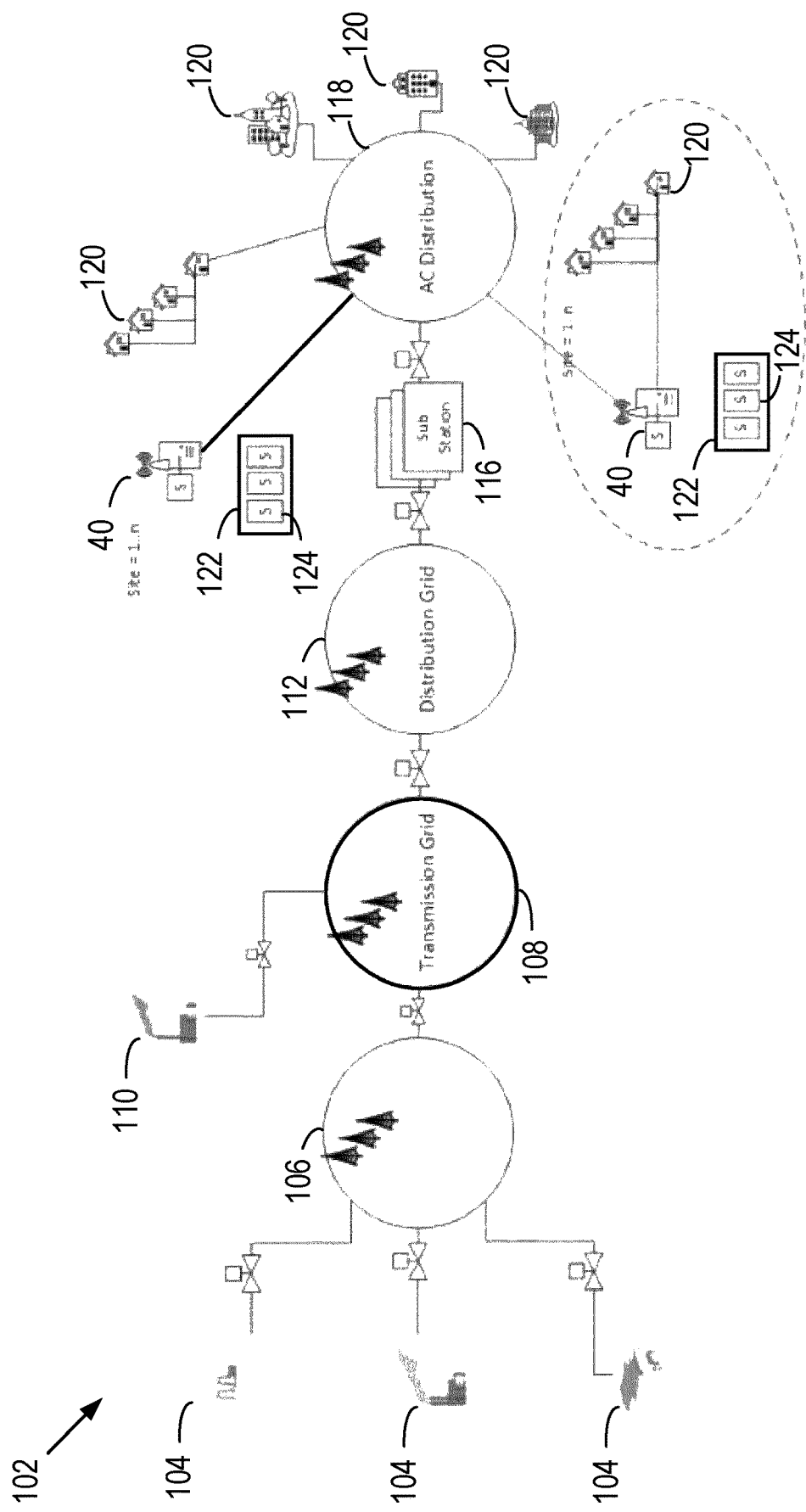
FIG. 5 illustrates an exemplary power distribution network with radio access nodes having local energy storage systems of a distributed energy storage network according to an embodiment.

FIG. 5 shows an exemplary power distribution network according to an embodiment of the techniques described herein. In FIG. 5, the power distribution network 102 generally comprises a number of power sources 104 (for example fossil fuel power stations, nuclear power stations, wind turbines, hydroelectric dams, etc.) that generate energy/electricity and that are connected to an extra high voltage part 106 of the distribution network (e.g. that operates in the range of 265-275 kiloVolts (kV). The extra high voltage part 106 is connected to a transmission grid 108, into which other power sources 110, such as industrial and mid-sized power plants, can feed energy/electricity. The transmission grid 108 typically carries electricity at high voltage, e.g. 110 kV and above. The transmission grid 8 is connected to a distribution grid 112 (that typically operates at a low voltage 50 kV). The distribution grid 112 is connected to a number of sub-stations 116 that distribute the energy/electricity into an alternating current (AC) distribution grid 118. Various different loads 120 (i.e. consumers of the energy/electricity) are connected to the AC distribution grid 118. The loads 120 may include electricity-consuming devices in homes and businesses. Radio access nodes 40 (e.g. radio base stations (RBS)) that are part of a communication network can also receive electricity from the AC distribution grid 118.

According to the techniques described herein, each of the radio access nodes 40 is associated with a local energy storage system 122 that is part of a distributed energy storage network. The local energy storage system 122 can comprise one or more energy storage cabinets 124 that store energy/electricity provided by the power distribution network 102. The local energy storage system 122 can make use of any suitable technology for storing energy, including batteries, e.g. Li-ion batteries or Valve Regulated Lead Acid (VRLA) batteries. The local energy storage system 122 can be co-located or otherwise located on the same or a nearby site to the radio access node 40. The radio access node 40 can manage and/or control the supply of power from the local energy storage system 122 to the AC distribution grid 118, for example in response to faults occurring in the power distribution network 102 as a whole, or in a part of the power distribution network 102 local to the radio access node 40. In this way the performance of the power distribution network 102, and in particular robustness of faults, can be improved.

By providing and controlling a local energy storage system 122 with a radio access node 40 (e.g. one or more energy storage cabinets 124 together with an RBS 40), and in particular controlling the storage and distribution of energy using the radio access node 40, one or more of problems described above with reference to centralised energy storage can be addressed.

Communication network operators already have many radio access node sites installed and located near to power consumers (e.g. homes and businesses) 120. This is especially evident in urban environments where radio access node sites are densely distributed to meet the data traffic demands from a large number of subscribers per square kilometre. Providing local energy storage at these radio access node sites means that the energy is stored much closer to the end users of the energy. The stored energy can be released in the event of a fault in the AC distribution grid 118 local to the radio access node 40, or more generally in the AC distribution grid 118, which reduces the time required for the stored energy to reach the required places in the grid 118.

With the radio access node 40 controlling a local energy storage system 122 as described above, the time required to stabilise the power distribution network 102 when a power dip occurs (e.g. due to a power source 104 going offline or end-user demand increasing beyond supply) can be reduced, both in terms of the time taken to detect and/or localise a fault and in the time taken to release stored energy into the relevant part of the network to minimise (or avoid) any interruption of the AC power to consumers 120.

Thus, energy can be stored locally, on already-built radio access node sites, and be used to form a distributed energy storage network. The number of energy storage cabinets 124 in the local energy storage system 122 can be determined based on a variety of factors, including the likely local demand for the stored energy (for example the number of nearby end-users of the power distribution network 102), the space available at the radio access node site, etc. Being able to use the radio access node sites in this way reduces or eliminates the need for a standalone distributed energy storage network provider to obtain leases for new energy storage sites close to consumers 120, which is an expensive proposition, especially in cities where leasing or purchasing land is generally expensive.

Figure 6:
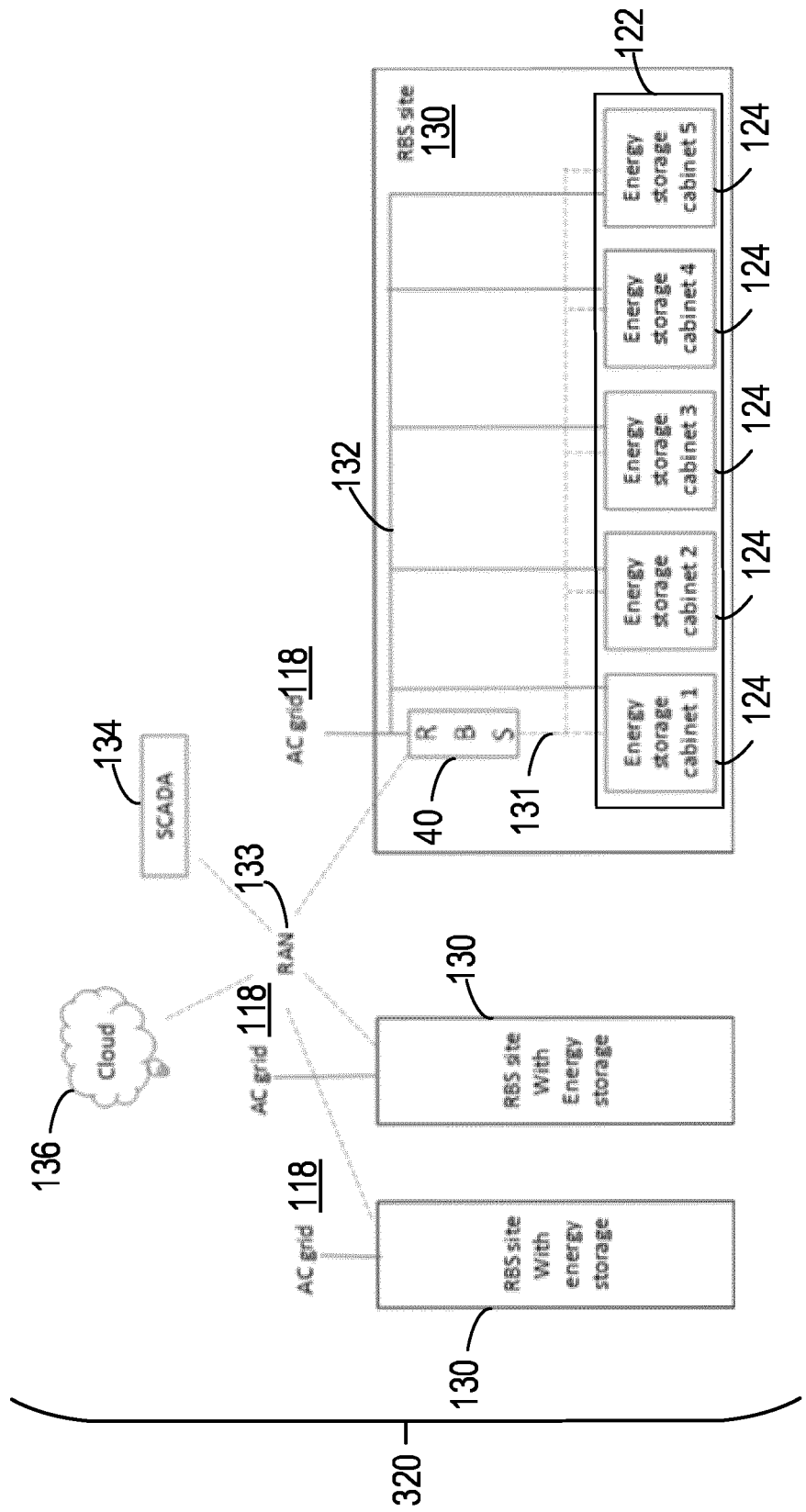
FIG. 6 illustrates an exemplary arrangement for enabling a communication network to interact with a power distribution network.

FIG. 6 illustrates an exemplary arrangement for enabling a communication network to interact with a power distribution network. Each radio access node 40 (referred to hereafter as an RBS) is part of an RBS site 130 and the site 130 includes a local energy storage system 122 that can comprise one or more energy storage cabinets 124 for storing energy (electrical energy). The RBS 40 is connected to the local energy storage system 122 and thus to each of the energy storage cabinets 124 via connection 131 to enable the RBS 40 to monitor the status of the local energy storage system 122 (e.g. monitoring the charge level) and/or to control the local energy storage system to release energy to the AC distribution network 118. Signalling sent to and/or received from the local energy storage system 122 can be managed by the scheduler in the RBS 40. The RBS scheduler generally operates to allocate data traffic in RBS but can be extended to use for storage operations and energy storage activation. The functions of the RBS scheduler are described in more detail below with reference to FIG. 8. The RBS 40 and local energy storage system 122 are both connected to the AC distribution grid 118 via a connection 132. The RBS 40 can therefore receive power from the AC distribution grid 118, and, in some embodiments, can monitor the operation of the AC distribution grid 118 via this connection 132. This connection 132 may be provided by or be part of the power supply unit in the RBS 40. The local energy storage system 122 can receive energy from AC distribution grid 118 for storage and can release energy to the AC distribution grid 118 via connection 132.

Several (three in this example) RBS sites 130 are shown in FIG. 6, with each being connected to, or part of, the radio access network (RAN) 133 of the communication network 32. The radio access network 133 is connected (in some cases via one or more intermediate nodes) to a control node in the power distribution network, and in particular to a Supervisory Control and Data Acquisition (SCADA) node 134. The radio access network 133 is also connected to the cloud 136 (e.g. the Internet).

Those skilled in the art will appreciate that there are a variety of ways in which energy can be provided from the local energy storage system 122 to the AC distribution grid 118. In the arrangement of FIG. 6, separate battery inverter activation can be used to provide the energy direct to the grid 118 via connection 132 under control of the RBS 40. In an alternative arrangement to that shown in FIG. 6, a bidirectional power supply unit (PSU) inside the RBS 40 can be used to pass the energy from the local energy storage system 122 to the grid 118 (and optionally to the RBS 40 as well) in the event of a fault in the grid 118, as well as allowing the RBS 40 to receive energy from the AC distribution grid 118 for powering the RBS 40 and for charging the local energy storage system 122.

The signalling paths to the cloud 136 and the SCADA node 134 via RAN 133 enable the RBSs 40 to interact with the operator of the power distribution network 102. In some embodiments, outage (fault) information can be sensed at a RBS 40 by monitoring the PSU AC input (power line input) from the AC distribution grid 118 to the RBS 40. The sensing of a fault on the PSU AC input can be used by the RBS 40 to activate the local energy storage system 122 (i.e. to release some of the stored energy to the local part of the AC distribution grid 118). In some cases, other RBSs 40 that are close to the RBS 40 that detected the fault can also activate energy support and control their respective local energy storage system 122 to release energy to the local part of the AC distribution grid 118.

Thus, the techniques described herein require a signalling path for the activation and deactivation of local energy storage systems 122 (i.e. release and storage of energy), for information exchange, for status monitoring, and for control. By providing this signalling path, a faster method for activation and localisation of outages and faults for a power distribution network 102 is realised.

In embodiments where the radio access node 40 monitors an electricity supply to the power supply unit (PSU) of the RBS 40, the parameter or parameters that can be monitored and used as a trigger for detecting a fault can be a supply voltage and/or the supplied current. For example, a fault can be detected if the supply voltage is below a threshold (or the supply voltage is above another threshold). Likewise, a fault can be detected if the sensed current is below a threshold (or the sensed current is above another threshold). The value of the threshold(s) can be set by the operator of the power distribution network 102, and optionally modified or adjusted to improve the stability of the network 102.

Figure 7:
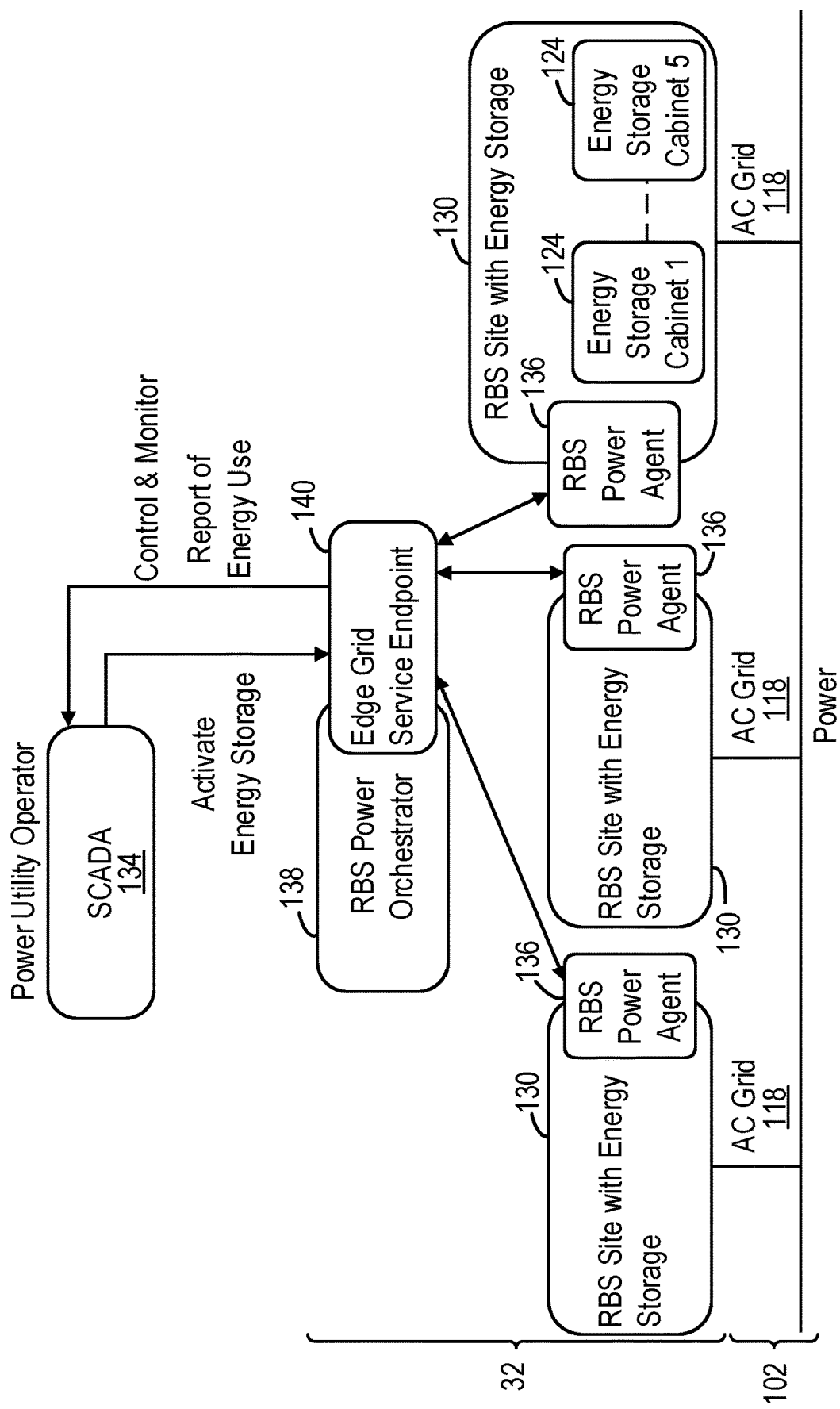
FIG. 7 illustrates the exemplary arrangement of FIG. 6 in more detail.

FIG. 7 illustrates the exemplary arrangement of FIG. 6 in more detail. In particular, each RBS/radio access node 40 has a power agent 136 that is provided for enabling the RBS 40 to communicate with another node in the network 32, which is referred to in FIG. 7 as an RBS power orchestrator 138. The power agent 136 may be part of the RBS 40, on the same site 130 as the RBS 40, close to the site 130 or in the backhaul for the RBS 40. The power agent 136 is provided to handle the signalling relating to management and use of the local energy storage system 122 at the RBS site 130 and also handles communications with the RBS power orchestrator 138.

The power orchestrator 138 is part of the communication network 32 and is provided to manage information, for example to monitor and coordinate information to/from the (multiple) RBS sites 130 that have local energy storage systems 120. In particular, the power orchestrator 138 can manage information by exchanging signalling with the power agent 136 associated with each site 130, and synchronising information sent to and/or received from each site 130, for example to enable simultaneous activation of several local energy storage systems (if this is required). The power orchestrator 138 can be part of or communicate with control nodes in the core network 34, such as an MME 36. The power orchestrator 138 can also include an edge grid service endpoint 140 that provides an interface to the power distribution network 102, and in particular to the SCADA 134.

With this arrangement the communication network operator could provide distributed energy storage services to the operator of the power distribution network. This service is basically the provisioning of power stored on RBS sites 130 to balance power loss due to dips. The operator of the power distribution network 102 can have a single point of contact with the communication network operator, i.e. the service endpoint 140.

In a first embodiment of the service, which is referred to as an unmanaged service, the service endpoint 140 is bidirectional (as shown in FIG. 7) and a decision to locate and balance out a power dip rests with the operator of the power distribution network 102. An uplink to the operator of the power distribution network 102 from the power orchestrator 138 provides information on current use of energy from the RBS sites 130, while a downlink allows the operator of the power distribution network 102 to activate energy storage (in case a dip in the power in the AC distribution grid 118 is detected).

In a second embodiment of the service, which is referred to as a managed service, the service endpoint 140 is unidirectional (not as shown in FIG. 7). In this case, the nodes in the communication network 32 (e.g. the power orchestrator 138 and/or power agents 136/RBSs 40 locate and fix the faults. The operator of the power distribution network 102 can be informed via the service endpoint 140 about corrective actions taken by the communication network 32, including information on where and when the fault occurred, including its severity.

Figure 8:
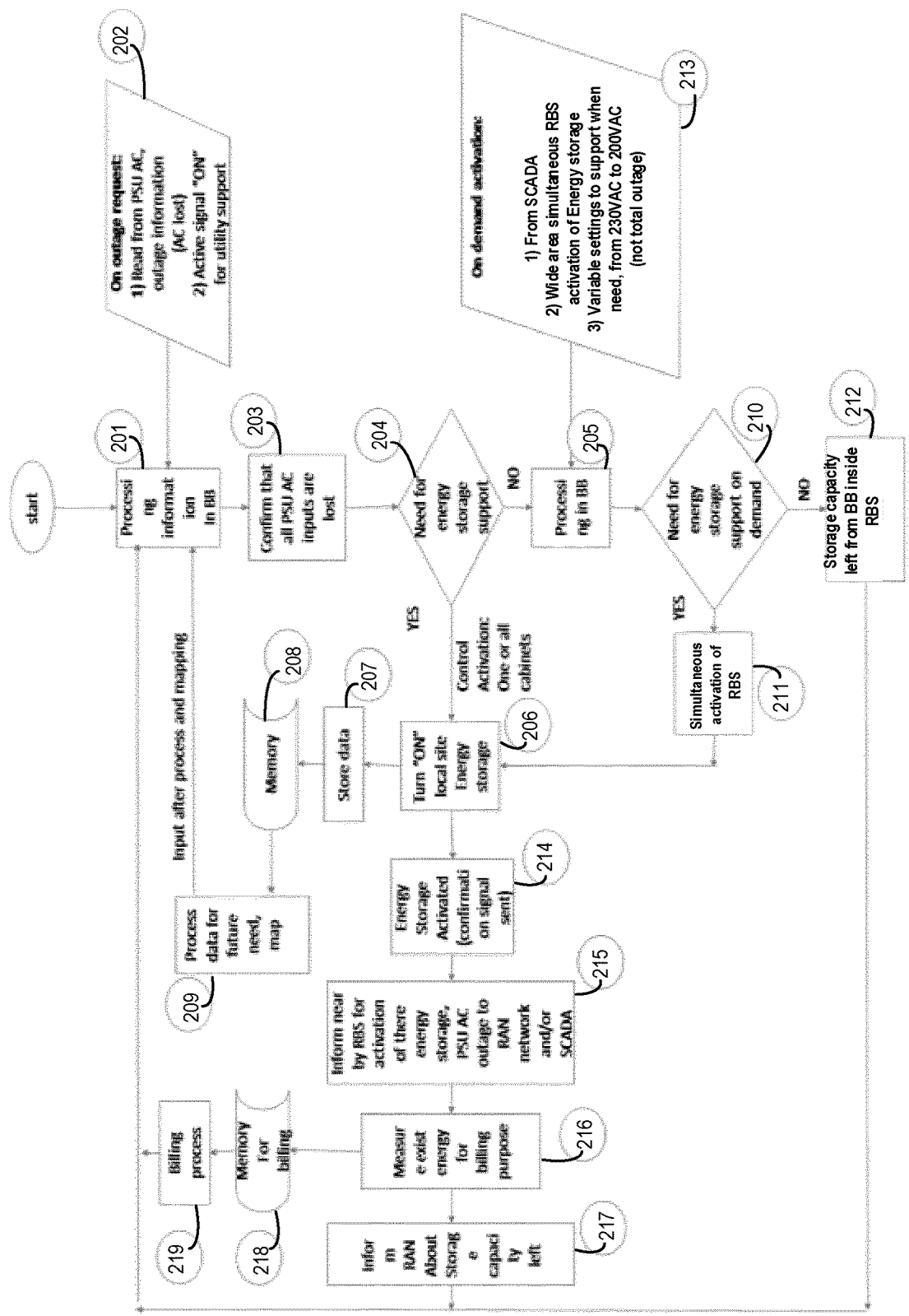
FIG. 8 illustrates a method of controlling a local energy storage system associated with a radio access node according to an embodiment.

The flow chart in FIG. 8 illustrates a method of controlling a local energy storage system 122 associated with a radio access node 40 according to an embodiment. In some embodiments, the method can be performed by the RBS power agent 136. The RBS 40 or RBS power agent 136 can receive inputs from and/or send information to a SCADA 134, an RBS scheduler, the AC distribution grid 118 and local energy storage system 122. In some embodiments, the method can be performed by the RBS power agent 136 in conjunction with the RBS scheduler. According to the method below, power from the local energy storage system 122 can be delivered on demand, or when there is a power outage. On demand activation can be used to stabilise the AC distribution grid 118, for example when demand exceeds supply.

In the first step, step 201, information is received. This information can relate to the voltage at the AC input of the RBS 40. This information can be handled in the baseband of the RBS 40. In some embodiments, this information is handled by the RBS scheduler.

In step 202, the information from the AC PSU is read to determine if there is an outage/fault (e.g. by comparing an input voltage to a threshold). Alternatively the AC PSU itself may provide a signal indicating a fault with the AC power supply. If there is a fault, a check can be performed that checks whether the RBS 40 is to provide support to the power distribution network 102 in the event of a fault. If there is a signal from the power distribution network 102 (e.g. sent from the SCADA 134) indicating that utility support can be provided, the method proceeds to step 203.

In step 203, a check is performed to ensure that all PSU AC inputs are experiencing the fault. In particular, it can be the case that sometimes one phase in an AC power supply is lost due to reasons other than a power outage. In this case, all PSU AC inputs are checked for the fault or for whether some PSU AC line phases have been lost. If this check indicates that some AC phases have been lost, then this is referred to as a phase imbalance, and is not considered a power outage that requires energy storage support.

Next, in step 204, it is determined whether the RBS 40 is required to provide energy storage support. This is determined based on the information obtained in steps 202 and 203. If energy storage support is not required, then in step 205, further information (e.g. from the AC PSU) is received and evaluated (in the baseband of the RBS 40, e.g. by the RBS scheduler).

In conjunction with step 205, in step 213 on demand activation parameters/data are set. These parameters/data are used by the RBS 40 to determine when the local energy storage system 122 should be activated on demand. These parameters/data can be provided from the SCADA 134, and can trigger the activation on demand as a result of wide area simultaneous activation of the distributed energy storage network or a need for voltage support demand (e.g. to provide support if the voltage of the supply in the AC distribution grid 118 falls below a 'normal' value (e.g. 230 Volts AC falls to 200 Volts AC), so on demand activation in the event that a total outage has not occurred.

If in step 204 the RBS 40 is required to provide energy support, then in step 206 the RBS 40 can turn "ON" the local energy storage system (in the sense that the energy storage system starts to provide energy to the AC distribution grid 118). The RBS scheduler can coordinate and/or manage the sending of the control signal to the local energy storage system.

Data is then stored (step 207) in a memory (block 208) and processed in step 209 for subsequent use, for example in forming a map of the AC distribution grid 118 (or a map of a part of the grid 118 that is local to the RBS 40). The data may relate to how much storage capacity has been used, how much stored energy has been used and/or whether energy support has been required or requested.

Returning to step 205, after the processing of the further information, it is determined in step 210 if there is a need for energy to be stored in the local energy storage system 122. This can be based on the parameters/data set in step 213.

If there is a need for energy to be stored, then the method passes to step 211 in which the RBS 40 is activated. Multiple RBSs 40 in a local or wide area can be activated simultaneously to store energy in their respective local energy storage systems 122.

The method then moves to step 206 in which the local energy storage system 122 is turned 'ON'.

If in step 210 there is not a need for energy to be stored, then in step 212 the RBS 40 determines the storage capacity left in the local energy storage system 122. This processing can be performed by the RBS scheduler. The method then returns to step 201.

After step 206, in which the local energy storage system 122 is turned 'ON', the method passes to step 214 in which a confirmation signal that the local energy storage system 122 has been activated is received from the local energy storage system 122 (or from a particular energy storage cabinet 124).

Next in step 215 nearby or neighbouring RBSs 40, the RAN and/or SCADA 134 are informed that the local energy storage system 122 for the current RBS 40 has been activated and/or that there is a PSU AC outage. The RBS scheduler can coordinate or manage this signalling to the other RBSs 40, the RAN and/or SCADA 134. This signalling could be sent using the X2 interface.

Next, in step 216, the amount of energy provided to the power distribution network 102 can be measured for billing purposes (e.g. billing from the communication network operator to the power distribution network operator).

After step 216, in step 217 the RAN (e.g. the power orchestrator 138) can be informed about the storage energy capacity in the distributed energy storage system and/or in individual local energy storage systems 122. The RAN can use this and other information to identify the location of any faults in the AC distribution grid 118 (or alternatively the RAN can pass this information to the SCADA 134 and the SCADA 134 can identify the location of any faults. The method can then return to step 101.

Also after step 216, in step 218 the billing information determined in step 216 is stored, and in step 219 a billing process can be used to charge the operator of the power distribution network 102 for the use of the distributed energy storage network.

Figure 9:
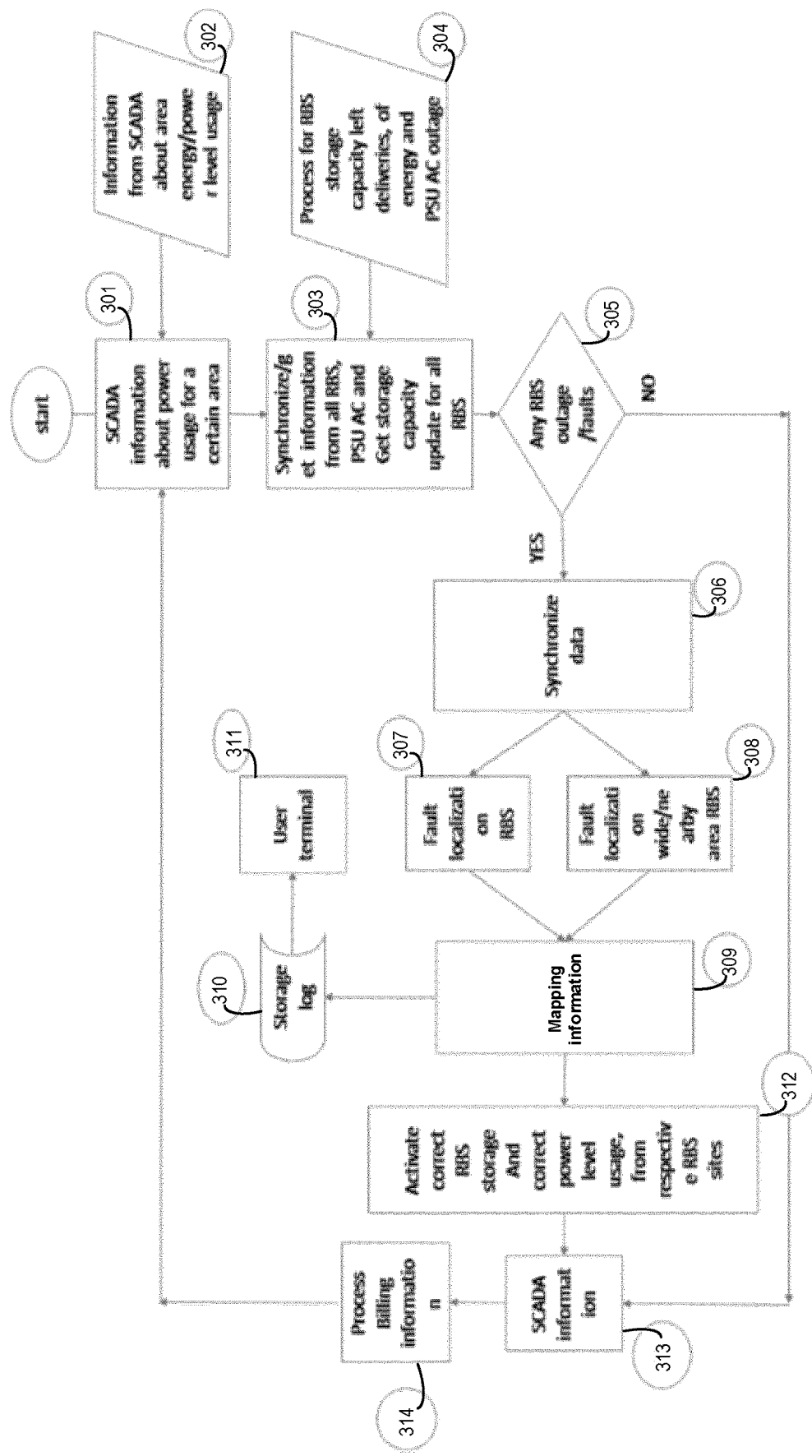
FIG. 9 illustrates a method of controlling a local energy storage system associated with a radio access node according to an embodiment.

The flow chart in FIG. 9 illustrates a method of controlling a local energy storage system 122 associated with a radio access node 40 according to an embodiment. The steps in the illustrated method are mostly performed in the RAN. In some embodiments, most of the steps of the method can be performed by the RBS power orchestrator 138. The power orchestrator 138 can receive inputs from and/or send information to a SCADA 134, an RBS scheduler and/or RBS 40. As with FIG. 8, according to the method below, power from the local energy storage system 122 can be delivered on demand, or when there is a power outage. On demand activation can be used to stabilise the AC distribution grid 118, for example when demand exceeds supply.

In step 301, information from SCADA 134 about the energy/power level in the area (e.g. the part of the AC distribution grid 118 in which the RBSs 40 associated with the power orchestrator are located) is received. Step 302 shows the sending of this information from the SCADA 134 (and so step 302 is not performed by the power orchestrator 138.

Next, in step 303, the power orchestrator 138 synchronises and/or gets information from all RBSs 40 in the area (or all RBSs 40 in the area having a respective local energy storage system 122). The information can comprise, for example, the PSU AC input status for each RBS 40, the remaining energy storage capacity in the local energy storage system 122 for each RBS 40, the amount of energy received from the AC distribution grid 118 and stored in the local energy storage system 122 for each RBS 40, etc. Step 304 shows the sending of this information from the RBSs 40 to the power orchestrator 138.

In step 305, it is determined whether any outage faults have occurred at an RBS 40. For example it is determined whether the AC input has been lost at any RBS 40, or whether the AC input voltage has fallen below a threshold value.

If it is determined in step 305 that an outage fault has occurred then in step 306 the data received in steps 301 and/or 303 is synchronised, for example to enable a map indicating the location of the fault(s) in the AC distribution network 118 to be created.

Next, in step 307, the location of the fault in the AC distribution grid 118 is determined, for example based on the location of the RBS 40 that detected the fault (e.g. the RBS 40 that reported the loss of PSU AC input).

In step 308, which can occur alongside step 307, the location of the fault in a wider part of the AC distribution grid 118 is determined, for example based on the reported PSU AC input from other RBSs 40 near to the RBS 40 that reported the fault.

In step 309 the fault localisation information is used to determine or generate a map of the AC distribution grid 118, for example showing the area or areas that are experiencing a fault.

This map information can be stored (step 310) and provided to a terminal or computer (step 311) so that the map can be viewed by a user of the power orchestrator 138 or operator of the power distribution network 102.

Also after step 309, in step 312 the power orchestrator 138 can activate the required RBSs 40 and local energy storage systems 122 to correct the fault in the AC distribution grid 118. Thus the power orchestrator 138 can send a suitable control signal to the power agent 136 of the appropriate RBSs 40. The required RBSs 40/local energy storage systems 122 will depend on the power level and whether those RBSs 40 are to provide local energy support.

Next, in step 313 (which also occurs after step 305 if no faults are detected), the map and/or RBS activation information is sent to the SCADA 134.

Finally, in step 314, the power orchestrator 138 can provide billing information or start a billing process, which can relate to the amount of energy provided to the power distribution network 102 by the distributed energy storage network owned by the communication network operator. The method can then return to step 301.

Figure 10:
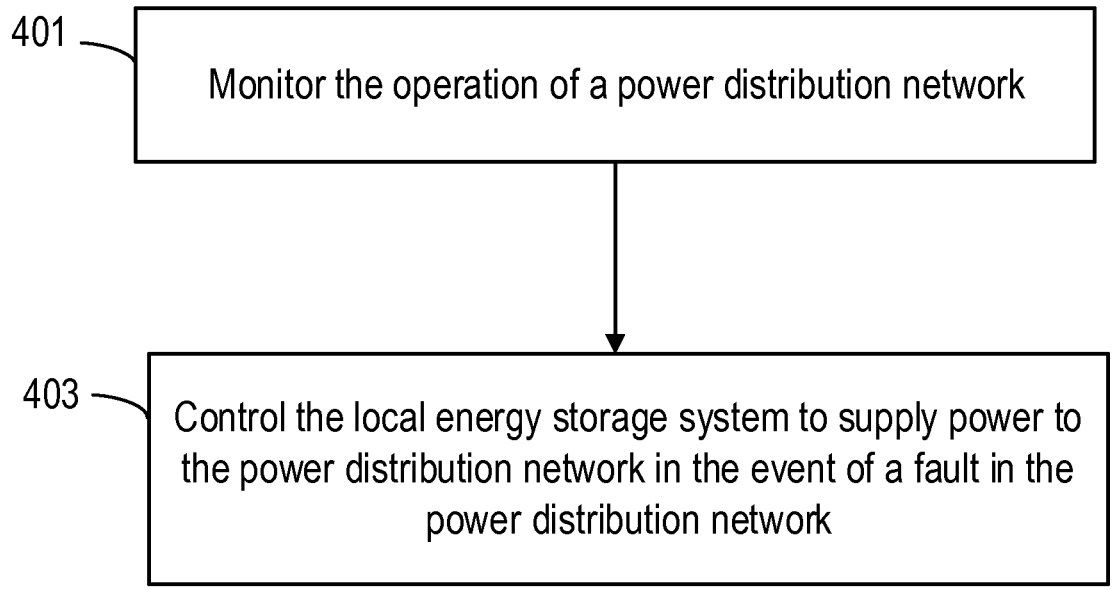
FIG. 10 is a flow chart illustrating a method of operating a radio access node according to an embodiment.

The flow chart in FIG. 10 shows a general method of operating a radio access node according to various embodiments, and which covers the exemplary method shown in FIG. 8. It will be appreciated that the method in FIG. 10 can be performed by the processing unit 60 or by a power agent 136 (in the event that the power agent 136 is physically separate from the main components of the radio access node 40).

In a first step, step 401, the operation of a power distribution network 102 is monitored. This monitoring includes monitoring the control of the power distribution network 102.

In some embodiments, monitoring the operation of the power distribution network 102 can include detecting whether a fault has occurred in the network 102. This monitoring can include monitoring a power supply to the radio access node 40 from the power distribution network 102. For example the input to the PSU of the radio access node 40 can be monitored. In some embodiments, the radio access node 40 can detect a fault in the power distribution network 102 if the power supplied by the power distribution network 102 is below a threshold value. This threshold value can be set by the SCADA 134, a power orchestrator 138 or other node in the power distribution network 102, for example a network operating centre (NOC).

If a fault is detected in the power distribution network 102 in step 401, the local energy storage system 122 for the RBS 40 can be controlled to supply power to the power distribution network 102 (step 403).

In some embodiments, a control signal may be received from a node in the communication network (e.g. power orchestrator 138) indicating a fault in the network 102, and step 403 can be triggered on receipt of that control signal.

In some embodiments, in step 401 the radio access node 40 monitors a power supply to the radio access node 40 from the power distribution network 102 and sends an indication of the operation of the power distribution network 102 to a node (e.g. power orchestrator 138 in the communication network 32.

In some embodiments, the exchange of signalling and/or information between the radio access node 40/power agent 136 and the power orchestrator 138 can be managed by the scheduler in the RBS. The use of the scheduler reduces the time taken to communicate the required information between the radio access node 40/power agent 136 and the power orchestrator 138, and thus reduces the time taken to react to or address faults in the power distribution network 102.

In some embodiments, monitoring the operation of the power distribution network 102 in step 401 can also include measuring various parameters and/or making diagnostic measurements of the network 102.

In some embodiments, the method further comprises monitoring the operation and/or status of the local energy storage system 122. This monitoring can, for example, monitor the current amount of stored energy, the remaining storage capacity, the amount of energy released to the AC distribution grid 118, etc. An indication of the operation and/or status of the local energy storage system 122 can then be sent to a node in the communication network 32 (e.g. power orchestrator 138) or a control node for the power distribution network 102 (e.g. SCADA 134).

In some embodiments, in addition to controlling the supply of power to the power distribution network 102 in the event of a fault in the network 102, the radio access node 40/power agent 136 can control the local energy storage system to supply power to the power distribution network 102 on demand (i.e. not in response to a full outage or fault). Thus, in these embodiments the radio access node 40/power agent 136 can control the local energy storage system to supply power to the power distribution network 102 in response to receiving a signal from a node in the communication network 32 (e.g. power orchestrator 138) or a control node for the power distribution network 102 (e.g. SCADA 134).

In some embodiments, the method can further comprise sending an indication of the operation of the power distribution network 102, an indication of the presence or absence of a fault in the power distribution network 102, and/or an indication of the operation and/or status of the local energy storage system 122 to another radio access node 40/power agent 136 in the communication network 32.

Preferably, the communication network 32 comprises a plurality of radio access nodes 40 that are each associated with a respective local energy storage system 122 of a distributed energy storage system.

Figure 11:
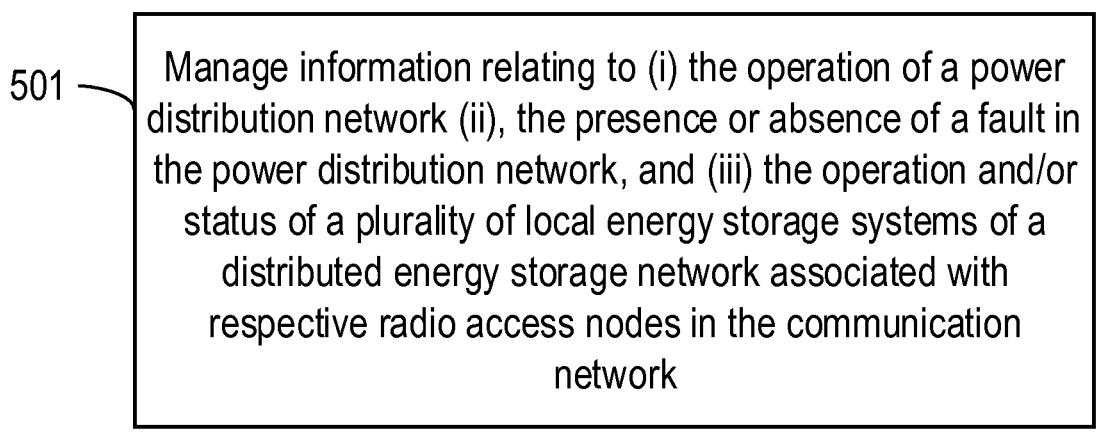
FIG. 11 is a flow chart illustrating a method of operating a node in a communication network according to an embodiment.

The flow chart in FIG. 11 shows a general method of operating a node in a communication network 32 according to various embodiments, and which covers the exemplary method shown in FIG. 9. It will be appreciated that the method in FIG. 11 can be performed by the processing unit 71 and inter-node interface 72. As noted above, the node 70 can be a power orchestrator 138.

In step 501, the node 70 can manage information relating to one or more of the operation of a power distribution network 102, the presence or absence of a fault in the power distribution network 102, and the operation and/or status of a plurality of local energy storage systems 122 of a distributed energy storage network associated with respective radio access nodes 40 in the communication network 32. Managing the information can comprise any one or more of sending information, receiving information and synchronising information. In certain embodiments, the node 70 manages the information by sending the information to one or more radio access nodes 40 or a control (e.g. SCADA) node 134 in the power distribution network 102. In certain other or further embodiments, the node 70 manages the information by receiving the information from one or more radio access nodes 40 or a control (e.g. SCADA) node 134 in the power distribution network 102. In certain other or further embodiments, the node 70 manages the information by synchronising information received from or being sent to multiple radio access nodes 40.

The information sent in step 501 can be sent to one or more radio access nodes 40/power agents 136, and/or sent to a control node in the power distribution network 102 (e.g. SCADA 134). The one or more radio access nodes 40 can each be associated with a respective local energy storage system 122, with the one or more local energy storage systems 122 forming a distributed energy storage network. In some embodiments, the indication of the presence or absence of a fault in the power distribution network 102 can indicate a status of a power supply to a radio access node 40 from the power distribution network 102.

In some embodiments, step 501 comprises receiving an indication of the presence and/or absence of a fault in the power distribution network 102 from a plurality of radio access nodes 40. In this case, the method can further comprise determining the location of a fault in the power distribution network 102 on the basis of the received indication or indications. In some embodiments, the method further comprises sending an indication of the determined location of the fault to a control node for the power distribution network 102 (e.g. to the SCADA 134).

In some embodiments, the method further comprises generating a map of at least part of the power distribution network 102 based on the received indication or indications. The map can indicate the presence and/or absence of a fault in the power distribution network 102 at a plurality of locations, particularly locations corresponding to the locations of the radio access nodes 40 from which the indication or indications were received.

In some embodiments, the method further comprises the node 70 (e.g. power orchestrator 138) sending a control signal to the radio access node 40 or power agent 136 at the node 40 indicating that the local energy storage system 122 is to be controlled to supply power to the power distribution network 102.

The techniques described herein can provide a value added service (VAS) platform for providing a distributed energy storage network operated by an RBS infrastructure for providing uninterrupted AC power to households and enterprises connected to a conventional AC distribution grid 118.

An overall billing and pricing model can depend on the party that sets up and maintains the local energy storage systems 122 of the distributed energy storage network at the RBS sites 130.

Possible models include:

- the RBS site 130 local energy storage system 122 is owned by the communication network provider or a maintenance company for the communication network provider, and a revenue sharing arrangement is negotiated with the operator of the power distribution network 102.
- the operator of the power distribution network 102 has invested in setting up the appropriate capacity of local energy storage systems 122 at the RBS sites 130 based on demand projection of backup power in a locality/area of coverage, and a rental agreement can be arranged between the communication network operator and operator of the power distribution network 102.
- A VAS provider can be responsible for setting up and maintaining the required local energy storage system 122 at every RBS site 130.
- The billing process can set the dynamic pricing for the energy consumer (e.g. household, enterprise, community, etc.) against each energy meter. It can collect the following inputs to determine the dynamic rate to be applied to the consumers in the event that energy from the distributed energy storage network case is consumed in case of a grid power supply failure. The inputs can include rates negotiated with power trading companies, supply forecast from a transmission/distribution grid, load/demand forecast from each wide area network (WAN) based on utilities connected, demand projection from neighbouring microsites that are in need of higher uninterrupted power (e.g. due to a localised distribution fault) and possible candidates for peer power trading from a microsite having surplus stored energy.

Thus, the above embodiments provide various advantages of a centralised energy storage system. The advantages include that adding and using local energy storage systems for a distributed energy storage network with existing RBS infrastructure hardware and controlling the systems using the RBS and a power orchestrator, increases the benefits for communication network operators or power distribution network operators. Another advantage is that adding the method and control functionality into a communication network infrastructure, sharing information between the RBS 40 and SCADA 134, and connecting the RBS sites 130 to the AC distribution grid 118 via, e.g. a bidirectional power supply unit, will provide a more flexible and adaptable energy storage utility. Another advantage is that the RBS sites 130 can be self-reliant and do not need intervention from the power distribution network 102, and the fault isolation and backup power restoration is faster compared to traditional centralised energy storage approaches. Moreover, the energy stored at the RBS site 130 can be delivered to the grid 118 on demand very quickly to stabilise the grid voltage, because the storage of energy and sensing of grid voltage is near the load i.e. the end user. As an example, restoration following a fault can be achieved in less than 10 ms, where a conventional centralised energy storage solution might require of the order of 2 minutes.

Modifications and other variants of the described example(s) and embodiment(s) will come to mind to one skilled in the art having the benefit of the teachings presented in the foregoing descriptions and the associated drawings. Therefore, it is to be understood that the example(s) and embodiment(s) is/are not to be limited to the specific examples and embodiments disclosed and that modifications and other variants are intended to be included within the scope of this disclosure. Although specific terms may be employed herein, they are used in a generic and descriptive sense only and not for purposes of limitation.

The invention claimed is:

1. A radio access node for use in a communication network comprising a plurality of radio access nodes and a core network, the radio access node being associated with a local energy storage system that is part of a distributed energy storage network, the radio access node comprising:
   a radio transceiver configured to communicate with one or more wireless devices accessing the communication network via the radio access node;
   a processor; and
   a memory, said memory containing instructions executable by said processor whereby said radio access node is configured to:
   monitor the operation of a power distribution network;
   in the event of a fault in the power distribution network, control the local energy storage system to supply power to the power distribution network for distribution via the power distribution network.

2. The radio access node of claim 1, wherein the radio access node is configured to detect a fault in the power distribution network.

3. The radio access node of claim 2, wherein the radio access node is configured to monitor a power supply to the radio access node from the power distribution network to detect a fault in the power distribution network.

4. The radio access node of claim 3, wherein the radio access node is configured to detect a fault in the power distribution network in the event that the power supplied by the power distribution network is below a threshold value.

5. The radio access node of claim 1, wherein the radio access node is configured to receive a control signal from a node in the communication network indicating a fault.

6. The radio access node of claim 1, wherein the radio access node is configured to monitor the operation of the power distribution network by monitoring a power supply to the radio access node from the power distribution network; and
   wherein the radio access node is further configured to send an indication of the operation of the power distribution network to a node in the communication network.

7. The radio access node of claim 1, wherein the radio access node is further configured to:
   monitor the operation and/or status of the local energy storage system; and
   send an indication of the operation and/or status of the local energy storage system to a node in the communication network or a control node for the power distribution network.

8. The radio access node of claim 1, wherein the radio access node is further configured to:
   control the local energy storage system to supply power to the power distribution network in response to receiving a signal from a node in the communication network or a control node for the power distribution network.

9. The radio access node of claim 1, wherein the radio access node is further configured to:
   send, to another radio access node in the communication network, an indication of the operation of the power distribution network, an indication of the presence or absence of a fault in the power distribution network, and/or an indication of the operation and/or status of the local energy storage system.

10. The radio access node of claim 1, wherein the radio access node comprises a scheduler that is configured to control (i) the sending of information to a node in the communication network, (ii) the sending of information to a control node for the power distribution network and/or (iii) the local energy storage system to supply power to the power distribution network.

11. A method of operating a radio access node in a communication network comprising a plurality of radio access nodes and a core network, the radio access node being associated with a local energy storage system that is part of a distributed energy storage network, the radio access node comprising a radio transceiver configured to communicate with one or more wireless devices accessing the communication network via the radio access node, the method comprising:
 monitoring the operation of a power distribution network;
 in the event of a fault in the power distribution network, controlling the local energy storage system to supply power to the power distribution network for distribution via the power distribution network.

12. A node for use in a communication network comprising a plurality of radio access nodes and a core network, the node comprising:
 a radio transceiver configured to communicate with one or more wireless devices accessing the communication network via the radio access node;
 a processor; and
 a memory, said memory containing instructions executable by said processor whereby said node is configured to:
  manage information relating to one or more of: (i) the operation of a power distribution network, (ii) the presence or absence of a fault in the power distribution network, and (iii) the operation and/or status of a plurality of local energy storage systems of a distributed energy storage network associated with respective radio access nodes in the communication network; and
  wherein the node is configured to control a local energy storage system to supply power to the power distribution network for distribution via the power distribution network.

13. The node of claim 12, wherein the node is configured to manage the information by one or both of sending the information to, and receiving the information from, a control node for the power distribution network.

14. The node of claim 12, wherein the node is configured to manage the information by one or both of sending the information to, and receiving the information from, the radio access node in the communication network.

15. The node of claim 12, wherein the node is configured to manage the information by one or both of sending the information to, and receiving the information from, a plurality of radio access nodes in the communication network, each radio access node being associated with a respective local energy storage system of the distributed energy storage network.

16. The node of claim 15, wherein the node is configured to receive an indication of the presence and/or absence of a fault in the power distribution network from the plurality of radio access nodes; and
 the node is further configured to:
  determine the location of a fault in the power distribution network on the basis of the received indication or indications, and
  send an indication of the determined location of the fault to a control node for the power distribution network.

17. The node of claim 16, wherein the node is further configured to generate a map of at least part of the power distribution network based on the received indication, the map indicating the presence and/or absence of a fault in the power distribution network at a plurality of locations.

18. The node of claim 12, wherein the node is configured to send a control signal to the radio access node indicating that the local energy storage system is to be controlled to supply power to the power distribution network.

19. The node of claim 12, wherein the indication of the presence or absence of a fault in the power distribution network is received from a radio access node and indicates a status of a power supply to the radio access node from the power distribution network.

20. A method of operating a node in a communication network comprising a plurality of radio access nodes and a core network, the node comprising a radio transceiver configured to communicate with one or more wireless devices accessing the communication network via the node, the method comprising:
 managing information relating to one or more of: (i) the operation of a power distribution network, (ii) the presence or absence of a fault in the power distribution network, and (iii) the operation and/or status of a plurality of local energy storage systems of a distributed energy storage network associated with respective radio access nodes in the communication network; and
 wherein the node is configured to control a local energy storage system to supply power to the power distribution network for distribution via the power distribution network.

* * * * *